(12) United States Patent
Wang et al.

(10) Patent No.: US 7,625,504 B2
(45) Date of Patent: Dec. 1, 2009

(54) LIGHT PHOSPHOR WITH ZEOLITIC STRUCTURE

(75) Inventors: Sue-Lein Wang, Hsinchu (TW); Yueh-Chun Liao, Hsinchu (TW); Chia-Her Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 502 days.

(21) Appl. No.: 11/454,944

(22) Filed: Jun. 19, 2006

(65) Prior Publication Data

US 2007/0102670 A1  May 10, 2007

(30) Foreign Application Priority Data

Nov. 7, 2005 (TW) .................................. 94139015

(51) Int. Cl.
*C09K 11/70* (2006.01)
*C09K 11/54* (2006.01)
*C01B 39/00* (2006.01)
*C09K 11/02* (2006.01)
*B01J 29/04* (2006.01)

(52) U.S. Cl. .................. 252/301.6 P; 252/301.4 P; 252/301.6 R; 252/301.36; 423/705; 502/61

(58) Field of Classification Search ......... 423/700–702, 423/705; 252/301.36, 301.4 R, 301.6 R, 252/301.6 P, 301.4 P
See application file for complete search history.

(56) References Cited

OTHER PUBLICATIONS

Yueh-Chun Liao. A Zeolitic Organo-Metallophosphate Hybrid Material with Bimodal Porosity. J. Am. Chem. Soc., 2004, 126 (5), pp. 1320-1321.*
Pingyun Feng. Photoluminescence of open-framework phosphates and germanates. Chem. Commun., 2001, 1668-1669.*

* cited by examiner

*Primary Examiner*—C. Melissa Koslow
*Assistant Examiner*—Matthew E Hoban
(74) *Attorney, Agent, or Firm*—Bacon & Thomas, PLLC

(57) ABSTRACT

The present invention is related to a phosphor that can be excited by UV light between 375 to 400 nm to emit white light, which is intrinsically produced by emitting blue light with yellow light simultaneously. This compound is synthesized from organic amine, metal oxide and phosphate under hydrothermal conditions, and gives rise to a zeolitic structure with the chemical formula of $(A)_{5-x/2}[Zn_{9-x}Ga_xO(HPO_4)(PO_4)_8] \cdot yH_2O$ ($0<x<9$, $0<y<15$). On the other hand, when synthesized by different solvents, it is possible to obtain a phosphor of the same chemical formula and structure, but it can emit yellow light when excited by UV light or blue light emitted by LED between 300 to 500 nm.

31 Claims, 4 Drawing Sheets

LIGHT PHOSPHOR WITH ZEOLITIC STRUCTURE

FIELD OF THE INVENTION

The present invention is related to a phosphor with a zeolitic structure of a transition metal gallophosphate, and more particularly, the present invention is related to a phosphor that can emit yellow light, or can emit blue light, yellow light, or white light that is the mixture of blue light and yellow light.

BACKGROUND OF THE INVENTION

The main purpose of white LED in the future is thought to be the substitution for the traditional lighting, especially lighting equipment such as tungsten bulbs or fluorescent lights. This is because LED has more advantages than the traditional lighting; such as its small size, low heat emission, low energy consumption, longer longevity, shorter response time, and zero mercury pollution. Therefore, in addition to being employed in traditional lighting in the future, LED also has wide applications in various industries, such as being used as the indicator and internal lighting of cars, dashboard, as well as LCD backlight panel.

There are currently two major techniques for producing white LED globally; the first one is mainly employed in commerce right now, which produces white light by using a blue light emitting diode to excite yellow phosphor powder. However, the phosphor powder required by this technique is owned by companies in Japan and the U.S. For example, a yellow phosphor powder that is abbreviated as YAG, and with the composition of $(Y, Ce)_3Al_5O_{12}$, was developed by Nichia Corporation of Japan. On the other hand, a second technique that is still being developed now produces white light by using the UV-LED of the wavelength less than 400 nm to excite phosphor powders with three different RGB colors. Because more than one phosphor powders are required by this technique, it is not only necessary to find the phosphor powders that can complement one another, whether the deterioration rates of various phosphor powders are uniform must also be considered, which is an important factor that affects the quality of the resultant white light. Therefore, it can be concluded from above that phosphor powder will play a crucial role in the development of white LED, no matter in the current white LED techniques or the ones in the coming future.

The luminescence properties of a phosphor powder is related to its chemical composition, a phosphor powder of the same chemical composition and structure but with different luminescence properties has not yet be developed so far.

SUMMARY OF THE INVENTION

A primary objective of the present invention is to provide a novel phosphor, which has a zeolitic structure.

Another objective of the present invention is to provide a novel phosphor with zeolitic structure that can intrinsically emit yellow light, blue light, or white light that is produced by mixing blue light and yellow light.

Another objective of the present invention is to provide a method for emitting light, comprising exciting the phosphor of the present invention by a light from UV light to blue light having a wavelength between 270 to 500 nm, to emit yellow light, blue light, or white light that is produced by mixing blue light and yellow light.

A further objective of the present invention is to provide a method for preparing a novel phosphor with zeolitic structure.

In order to accomplish the above-mentioned objectives, a phosphor synthesized according to the present invention has a zeolitic structure and has a chemical formula as follows:

$$(A)_{5-x/2}[M_{9-x}Ga_xO(HPO_4)(PO_4)_8] \cdot yH_2O$$

wherein $0<x<9$; $0<y<15$, M is a transition metal, and A is a cation of Group 1A metal or a protonated organic amine. Preferably, the organic amine is 4,4'-trimethylenedipyridine, and the Group 1A metal is lithium, sodium, or potassium.

Preferably, M is a transition metal of Group 2B. More preferably, M is Zn.

Preferably, x is 6; y is 5.

The present invention also discloses a method of emitting light comprising exciting a phosphor powder as defined in claim 1 by using a light from UV light to blue light of the wavelength ranging from 270 to 500 mm.

The present invention further discloses a method for preparing a phosphor having a chemical formula as follows:

$$(A)_{5-x/2}[M_{9-x}Ga_xO(HPO_4)(PO_4)_8] \cdot yH_2O$$

wherein $0<x<9$; $0<y<15$, M is a transition metal, and A is a cation of Group 1A metal or a protonated organic amine, said method comprising the following steps:

preparing a mixed solution comprising a gallium source, a source of M, phosphate, a template, and water, and optionally an alcohol; and heating the mixed solution to carry out a hydrothermal reaction, wherein the gallium source comprises a gallium metal, a gallium salt, or a gallium oxides, and the M source comprises a M metal, a M metal salt, or a M metal oxide.

Preferably, the template comprises an organic amine, and more preferably, the organic amine is 4,4'-trimethylenedipyridine.

Preferably, M is a transition metal of Group 2B. More preferably, M is Zn.

Preferably, the alcohol is ethylene glycol or n-butanol.

Preferably, x is 6; y is 5.

Preferably, the mole ratio of 4,4'-trimethylenedipyridine: $Zn:Ga:H_3PO_4$ in the mixed solution equals to 6.4:1:1:6.

Preferably, the mixed solution does not comprise the alcohol. In this case, the phosphor so prepared emits yellow light with a wavelength between 520 to 620 nm, when the phosphor is excited by a light from UV light to blue light with a wavelength between 270 to 500 nm.

Preferably, wherein the mixed solution comprises the alcohol. In this case, the phosphor so prepared emits blue light with a wavelength between 400 to 500 nm, when the phosphor is excited by a light source with a wavelength between 270 to 420 nm; it emits yellow light with a wavelength between 520-650, when it is excited by a light source with a wavelength between 280 to 500 nm; it emits white light that is produced by mixing blue light and yellow light when it is excited by a light source with a wavelength between 280 to 420.

Preferably, the method for preparing a phosphor of the present invention further comprises contacting the resulting phosphor from the hydrothermal reaction with a solution containing cations of Group 1A metal, so that the protonated 4,4'-trimethylenedipyridine and the cations of Group 1A metal are cation exchanged.

Preferably, the hydrothermal reaction is carried out at 160 to 180° C. for a period of 1 to 10 days, and more preferably, for a period of 3 to 7 days.

Preferably, the hydrothermal reaction is carried out in the mixed solution having a pH value of 3.5 to 6.5, and more preferably, a pH value of 5.0.

Preferably, the mixed solution further comprises a diacid, and more preferably, the diacid is oxalic acid.

DETAILED DESCRIPTION OF THE PREFERRED EMBODIMENTS

Figure 1:
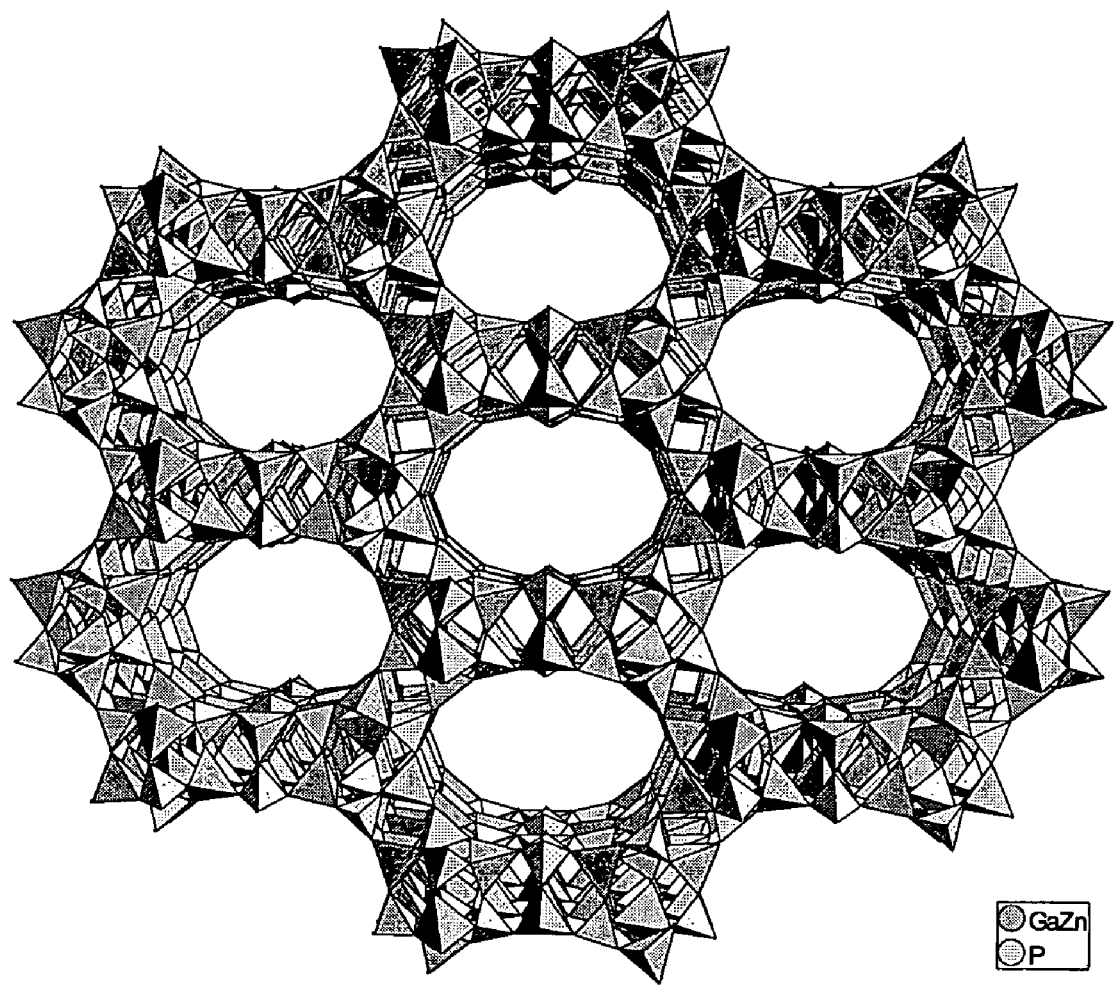
FIG. 1 is a schematic view showing the zeolitic structure of the phosphor having the formula (I) of the present invention.

A novel phosphor with zeolitic structure synthesized in one of the preferred embodiments of the present invention has a chemical composition described as below:

$$(A)_{5-x/2}[Zn_{9-x}Ga_xO(HPO_4)(PO_4)_8] \cdot yH_2O \quad (I)$$

wherein $0<x<9$, $0<y<15$, and A is a $NH_4^+$-containing cation or cation of Group 1A metal. As shown in FIG. 1, a zeolitic structure build up with unique tetrahedral of two $GaO_4$ and three $ZnO_4/GAO_4$ corner-shared with $HPO_4$ or $PO_4$ to generate a three-dimensional network. The cation of A in the formula (I) and water molecule reside in the channel intersections in the zeolitic structure.

A suitable method for preparing the phosphor of formula (I) is the hydrothermal technique, comprising the following steps:
(a) Organic amine, zinc source, and gallium source are dissolved or dispersed in aqueous phosphate solution, which is then placed in a reactor.
(b) A solvent is added into the reactor until the content in the reactor reaches 60% of the height of the reactor, and the resulting mixture is stirred thoroughly, and the pH value thereof is controlled at 5.0.
(c) The synthesis reaction is carried out under hydrothermal condition at a constant temperature of 160° C. for 1 to 10 days; the resultant product is a phosphor powder with zeolitic structure and has the chemical formula of (I). The yield is approximately 90%.

Preferably, the reactants in step (a) are 4,4'-trimethylenedipyridine (abbreviated as tmdp), zinc chloride ($ZnCl_2$), gallium oxide ($Ga_2O_3$), and aqueous phosphate solution (85% $H_3PO_4$). More preferably, the mole ratio between tmdp:$ZnCl_2$:$Ga_2O_3$:$H_3PO_4$ are 6.4:1:0.5:6. The constant temperature for reaction in step (c) is preferably maintained for 3 to 7 days.

The type of solvent utilized in step (b) will directly affect the luminescence properties of the resultant product. In one of the preferred embodiments of the present invention, where pure water was used as the solvent, the resultant product emitted yellow light with a wavelength of 550 nm when it was excited by UV light or blue LED. On the other hand, when the solvent used contained an organic solvent in addition to water, the resultant product emitted blue-purple light with a wavelength of 430 nm and yellow light with a wavelength of 550 nm when it was excited by UV light of 384 nm. These two emitted lights would then mix and generate a white light. Said organic solvent is a solvent having an OH radical, such as alcohols, and preferably is ethylene glycol or n-butanol. When the solvent used in step (b) contained an organic solvent having an OH radical, the amount of said organic solvent to pure water is 1:1 in volume to.

In the present invention, the cation A in the formula $(A)_{5-x/2}[Zn_{9-x}Ga_xO(HPO_4)(PO_4)_8] \cdot yH_2O$ is ion exchangeable, for example some or substantially all the organic amine cations (A in the formula) can be replaced by alkali metal ions by carrying out ion exchange in an aqueous solution containing metal ions of Group 1A at 80° C. Accordingly, A can be protonated tmdp (organic amine) or cation of Group 1A metal, but the luminescence properties thereof are the same.

The present invention can be better understood from the following examples which are merely for elucidation, not for restricting the scope of the present invention.

Example 1

Phosphor I-Y 1.267 g of tmdp, 0.136 g of zinc chloride ($ZnCl_2$), 0.094 g of gallium oxide ($Ga_2O_3$), and 0.405 ml of aqueous phosphate solution (85% $H_3PO_4$) were mixed together (the mole ratio between tmdp:$ZnCl_2$:$Ga_2O_3$:$H_3PO_4$:=6.4:1:0.5:6). The resulting aqueous solution was placed in a reactor, and then 12 ml of deionized water was added into the reactor. The content in the reactor was stirred thoroughly and an inorganic acid was added in order to control the pH value of the solution at 5.0. A hydrothermal reaction was carried out in the reactor at a constant temperature of 160° C. for 7 days, and a crystalline product of phosphor (I-Y) was obtained. Yield: approximately 90%.

A yellow plate-shaped crystal of adequate size was selected to carry out single-crystal X-ray diffraction analysis, from which its chemical formula is known to be $(H_2tmdp)_2[Zn_3Ga_6O(HPO_4)(PO_4)_8] \cdot 5H_2O$. Electron probe X-ray micro-analysis (EPMA) further proved that the atom ratio between Zn and Ga is 1:2. In addition, the following element analysis also proved that the organic contents in the formula.

| | Element Analysis: | | | | | |
|---|---|---|---|---|---|---|
| | N % | | C % | | H % | |
| | Calculated | Found | Calculated | Found | Calculated | Found |
| I-Y | 2.83 | 2.76 | 15.78 | 15.52 | 2.29 | 2.29 |

Example 2

Phosphor I-W 1.267 g of tmdp, 0.136 g of zinc chloride ($ZnCl_2$), 0.094 g of gallium oxide ($Ga_2O_3$), and 0.405 ml of aqueous phosphate solution (85% $H_3PO_4$) were mixed together (the mole ratio between tmdp:$ZnCl_2$:$Ga_2O_3$:$H_3PO_4$:=6.4:1:0.5:6). The resulting aqueous solution was placed in a reactor, and then a mixed solvent of 6 ml of deionized water and 6 ml of ethylene glycol was added into the reactor. The content in the reactor was stirred thoroughly and an inorganic acid was added in order to control the pH value of the solution at 5.0. A hydrothermal reaction was carried out in the reactor at a constant temperature of 160° C. for 7 days, and a crystalline product of phosphor (I-W) was obtained. Yield: approximately 90%.

A yellow plate-shaped crystal of adequate size was selected to carry out single-crystal X-ray diffraction analysis, from which its chemical formula is known to be $(H_2tmdp)_2[Zn_3Ga_6O(HPO_4)(PO_4)_8]\cdot 5H_2O$. EPMA data further proved that the atom ratio between Zn and Ga is 1:2. In addition, the following element analysis also proved that the organic contents in the formula.

| | Element Analysis: | | | | | |
|---|---|---|---|---|---|---|
| | N % | | C % | | H % | |
| | Calculated | Found | Calculated | Found | Calculated | Found |
| I-W | 2.83 | 2.76 | 15.78 | 15.52 | 2.29 | 2.29 |

The solvent used in EXAMPLE 1 is pure water, and the resultant product is a yellow powder I-Y with the chemical formula of $(H_2tmdp)_2[Zn_3Ga_6O(HPO_4)(PO_4)_8]\cdot 5H_2O$. Its luminescence properties are shown is FIG. 4. When the powder is excited by UV or blue light, it emits yellow light with a wavelength of 550 nm.

The solvent used in EXAMPLE 2 is a mixed solvent containing water and ethylene glycol (the volume ratio was 1:1), and the resultant product I-W is a brown powder that also has the chemical formula of $(H_2tmdp)_2[Zn_3Ga_6O(HPO_4)(PO_4)_8]\cdot 5H_2O$. Its luminescence properties are shown is FIG. 6. When the powder is excited by the most preferred UV light with the wavelength of 384 nm, it emits a blue-purple light of 430 nm and a yellow light of 550 nm simultaneously, and the two emitted lights intrinsically mix and produce a white light.

FIG. 1 shows the structure of phosphor powder I-Y or I-W prepared in EXAMPLEs 1 and 2, which is derived from the single-crystal X-ray diffraction analysis. They are of the monoclinic system, and the lattice constants are as follows: a=30.736(2) Å, b=13.557(1) Å, c=14.272(1) Å; β=109.728(2)°. From the figure, it can be seen that the structure is a zeolitic structure containing extra-large channels, wherein the longest distance across the cross-section of the channel is approximately 1.4 nm, and the shortest distance is approximately 0.96 nm.

Figure 2:
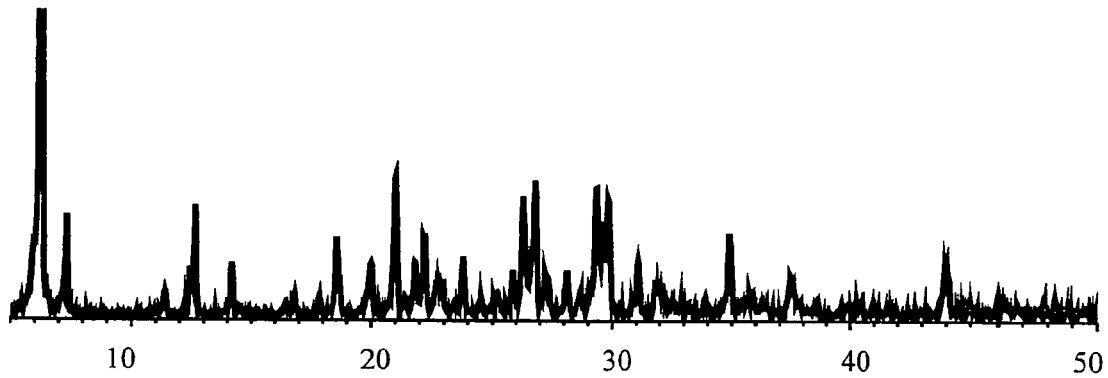
FIG. 2 is a powder X-ray diffraction pattern of the phosphor I-Y prepared by using water as the solvent in EXAMPLE 1 of the present invention.

FIG. 2 shows the powder X-ray diffraction pattern of the product I-Y prepared in EXAMPLE 1. It can be seen from FIG. 2 that the product I-Y is single phase.

Figure 3:
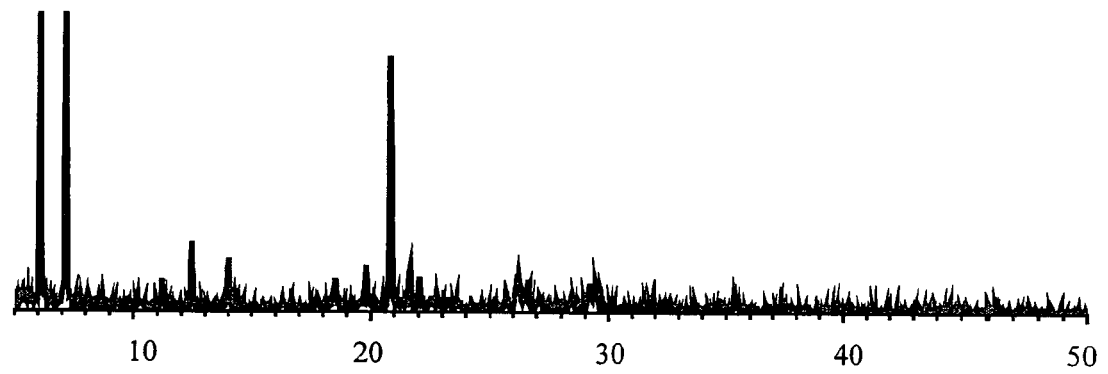
FIG. 3 is a powder X-ray diffraction pattern of the phosphor-I-W prepared by using a mixed solvent of water and ethylene glycol as the solvent in EXAMPLE 2 of the present invention.

FIG. 3 shows the powder X-ray diffraction pattern of the product I-W prepared in EXAMPLE 2. It can be seen from FIG. 3 that the structure of the product I-W is identical to that of I-Y, and it is also single phase.

Figure 4:
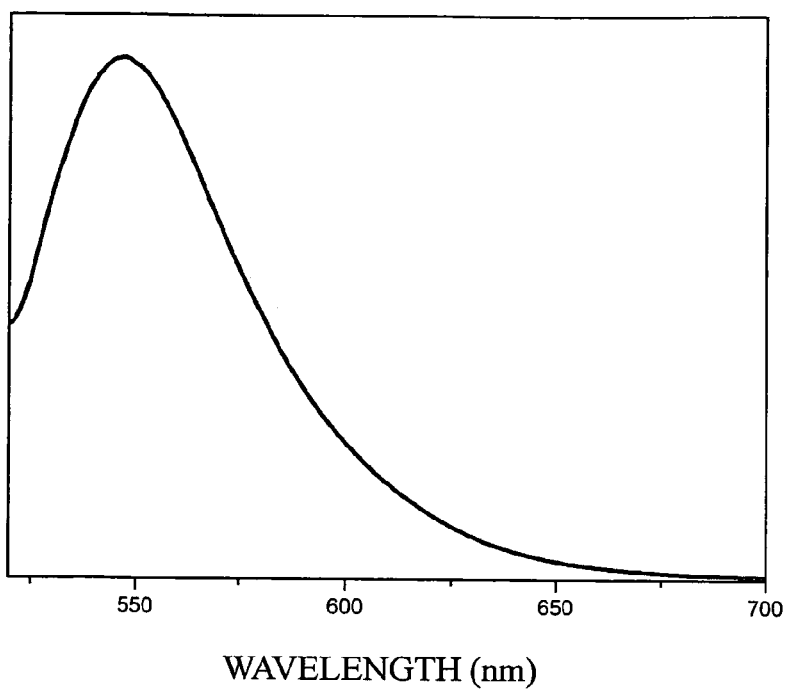
FIG. 4 is an emission spectrum of the phosphor I-Y prepared in EXAMPLE 1 of the present invention, which is excited by utilizing blue LED of 494 nm.

FIG. 4 is the emission spectrum emitted from the product I-Y prepared in EXAMPLE 1 when it is excited by blue light of wavelength 494 nm, wherein yellow light having a wavelength between 520 to 650 nm is emitted.

Figure 5:
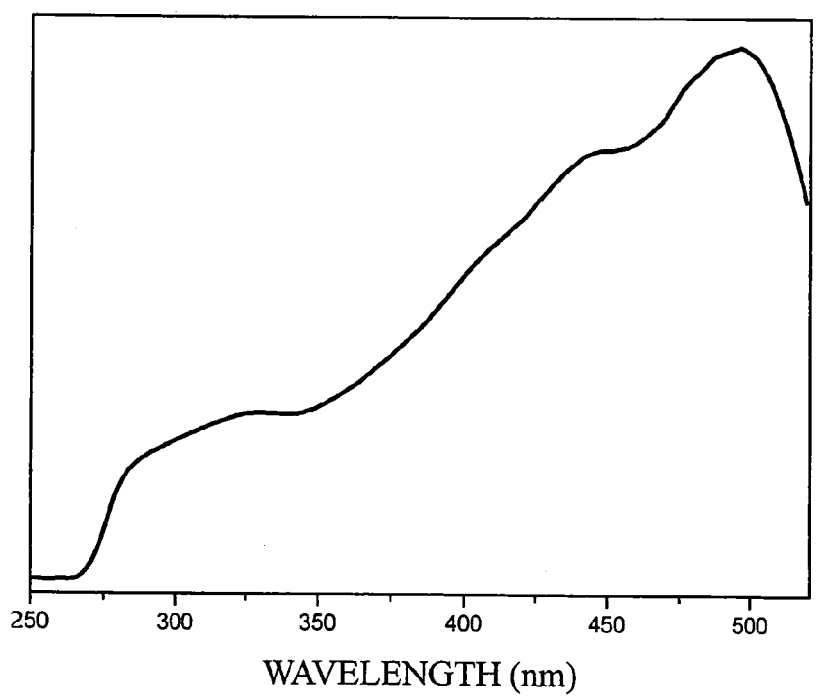
FIG. 5 is an excitation spectrum of the phosphor I-Y prepared in EXAMPLE 1 of the present invention.

FIG. 5 displays the excitation spectrum of product I-Y prepared in EXAMPLE 1, and it shows that when the product I-Y is excited by light sources of the wavelength between 280 to 500 nm, a yellow light of the wavelength between 520 to 650 nm will be emitted. This outcome indicates that when the phosphor powder I-Y of the present invention is excited by blue LED, a white light can be produced. Therefore, the product I-Y of the present invention can be used as a substitution for the traditional fluorescent lighting.

Figure 6:
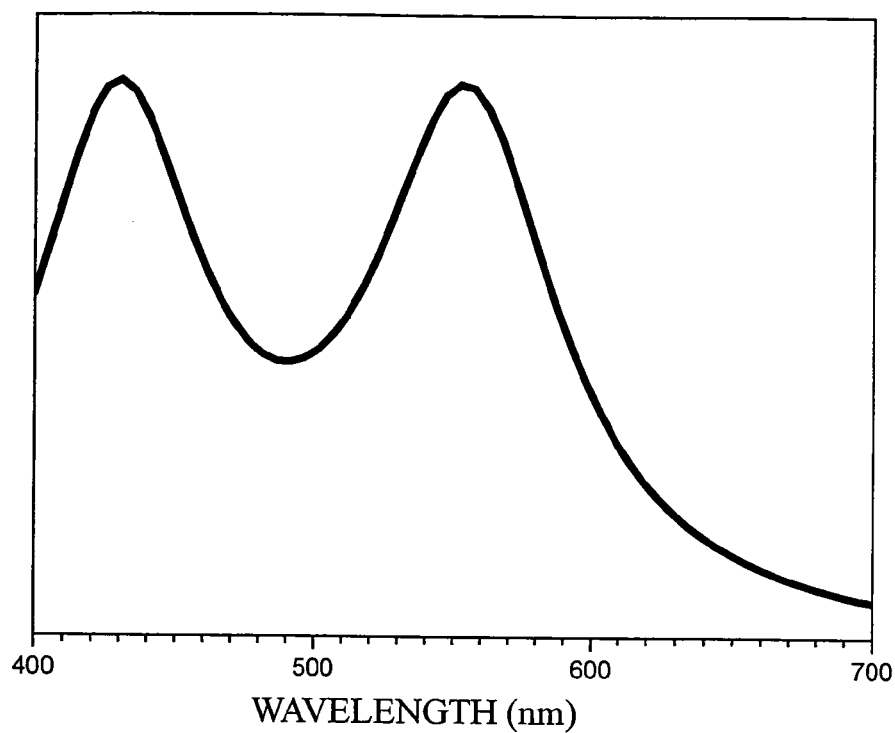
FIG. 6 is an emission spectrum of the phosphor I-W powder prepared in EXAMPLE 2 the present invention, which is excited by utilizing UV light of 384 nm.

FIG. 6 shows the emission spectrum of product I-W prepared in EXAMPLE 2 when it is excited by UV light of wavelength 384 nm. The spectrum shows product I-W emits two types of light simultaneously, one is a blue light of wavelength between 400 to 500 nm, and the other is a yellow light of wavelength between 520 to 650 nm. The results indicate that when product I-W of the present invention is excited by UV LED, a white light can be produced. CIE coordinates of the white light are (0.29, 0.34). Therefore, the product I-W of the present invention can be used as a substitution for the traditional fluorescent lighting.

Figure 7:
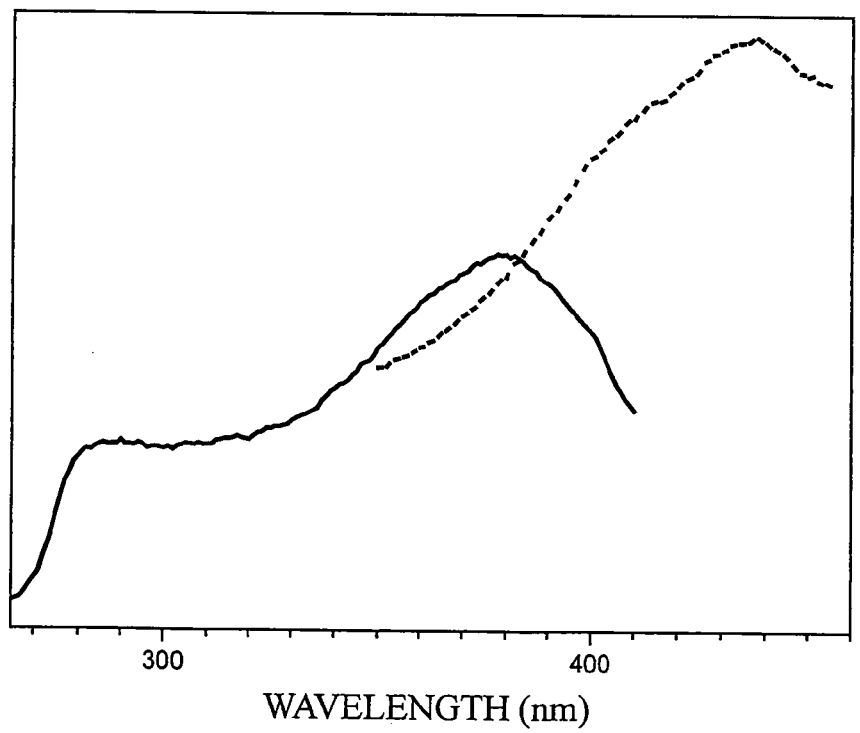
FIG. 7 is the excitation spectrum of phosphor I-W prepared in EXAMPLE 2 of the present invention.

FIG. 7 displays the excitation spectrum of product I-W prepared in EXAMPLE 2, wherein there are two different types of wavelength for the light source. When product I-W is excited by light source of the wavelength between 270 to 420 nm, as indicated by the solid line, a blue light of wavelength between 400 to 500 nm will be emitted. When product I-W is excited by light source of the wavelength between 280 to 500 nm, as indicated by the dotted line, a yellow light of wavelength between 520 to 650 nm will be emitted. The overlapping range of the two light sources is between 280 to 420 nm, and the best light source for white light is between 350 and 420 nm. The outcome indicates that when the phosphor powder I-W of the present invention is excited by UV LED with long wavelength, a white light can be produced. Even when the phosphor powder is excited by blue LED of wavelength between 430 to 500 nm, a white light can also be produced. These results suggest that the present invention has wide applications, and the products of the present invention can be used to replace the traditional fluorescent lighting.

The invention claimed is:

1. A phosphor with a zeolitic structure and having a chemical formula as follows:

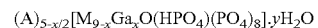

$(A)_{5-x/2}[M_{9-x}Ga_xO(HPO_4)(PO_4)_8]\cdot yH_2O$ wherein 0<x<9; 0<y<15, M is a transition metal, and A is a cation of Group 1A metal or a protonated organic amine.

2. The phosphor of claim 1, wherein M is a transition metal of Group 2B.

3. The phosphor of claim 2, wherein M is Zn.

4. The phosphor of claim 3, wherein x is 6; y is 5.

5. The phosphor of claim 1, wherein the organic amine is 4,4'-trimethylenedipyridine, and the Group 1A metal is lithium, sodium, or potassium.

6. The phosphor of claim 3, wherein the organic amine is 4,4'-trimethylenedipyridine, and the Group 1A metal is lithium, sodium, or potassium.

7. A method of emitting light comprising exciting a phosphor powder as defined in claim 1 by using a light from UV light to blue light of the wavelength ranging from 270 to 500 nm.

8. The method of claim 7, wherein M is a transition metal of Group 2B.

9. The method of claim 8, wherein M is Zn.

10. The method of claim 9, wherein x is 6; y is 5.

11. The method of claim 7, wherein the organic amine is 4,4'-trimethylenedipyridine, and the Group 1A metal is lithium, sodium, or potassium.

12. The method of claim 9, wherein the organic amine is 4,4'-trimethylenedipyridine, and the Group 1A metal is lithium, sodium, or potassium.

13. A method for preparing a phosphor having a chemical formula as follows:

$(A)_{5-x/2}[M_{9-x}Ga_xO(HPO_4)(PO_4)_8]\cdot yH_2O$ wherein 0<x<9; 0<y<15, M is a transition metal, and A is a cation of Group 1A metal or a protonated organic amine, said method comprising the following steps:

preparing a mixed solution comprising a gallium source, a source of M, phosphate, a template, and water, and optionally an alcohol; and heating the mixed solution to carry out a hydrothermal reaction, wherein the gallium source comprises a gallium metal, a gallium salt, or a gallium oxides, and the M source comprises a M metal, a M metal salt, or a M metal oxide.

14. The method of claim 13, wherein the template comprises an organic amine.

15. The method of claim 14, wherein the organic amine is 4,4'-trimethylenedipyridine.

16. The methods of claim 13, wherein M is a transition metal of Group 2B.

17. The method of claim 15, wherein M is Zn.

18. The method of claim 16, wherein the alcohol is ethylene glycol or n-butanol.

19. The method of claim 17, wherein x is 6; y is 5.

20. The method of claim 19, wherein the mole ratio of 4,4'-trimethylenedipyridine:Zn:Ga:$H_3PO_4$ in the mixed solution equals to 6.4:1:1:6.

21. The method of claim 20, wherein the mixed solution does not comprise the alcohol.

22. The method of claim 20, wherein the mixed solution comprises the alcohol.

23. The method of claim 21, wherein when the phosphor is excited by a light from UV light to blue light with a wavelength between 270 to 500 nm, it emits yellow light with a wavelength between 520 to 620 nm.

24. The method of claim 22, wherein when the phosphor is excited by a light source with a wavelength between 270 to 420 nm, it emits blue light with a wavelength between 400 to 500 nm; when it is excited by a light source with a wavelength between 280 to 500 nm, it emits yellow light with a wavelength between 520-650; when it is excited by a light source with a wavelength between 280 to 420, it emits white light that is produced by mixing blue light and yellow light.

25. The method of claim 19 further comprising contacting the resulting phosphor from the hydrothermal reaction with a solution containing cations of Group 1A metal, so that the protonated 4,4'-trimethylenedipyridine and the cations of Group 1A metal are cation exchanged.

26. The method of claim 16, wherein the hydrothermal reaction is carried out at 160 to 180° C. for a period of 1 to 10 days.

27. The method of claim 26, wherein the hydrothermal reaction is carried out for a period of 3 to 7 days.

28. The method of claim 13, wherein the hydrothermal reaction is carried out in the mixed solution having a pH value of 3.5 to 6.5.

29. The method of claim 28, wherein the pH value is 5.0.

30. The method of claim 13, wherein the mixed solution further comprises a diacid.

31. The method of claim 30, wherein the diacid is oxalic acid.

* * * * *

UNITED STATES PATENT AND TRADEMARK OFFICE
CERTIFICATE OF CORRECTION

PATENT NO. : 7,625,504 B2
APPLICATION NO. : 11/454944
DATED : December 1, 2009
INVENTOR(S) : Wang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 663 days.

Signed and Sealed this

Twenty-first Day of December, 2010

David J. Kappos
*Director of the United States Patent and Trademark Office*